July 18, 1939.  H. H. POLK ET AL  2,166,477
COMBINATION WHEEL RAMP AND WHEEL JACK
Filed March 6, 1939  2 Sheets-Sheet 1
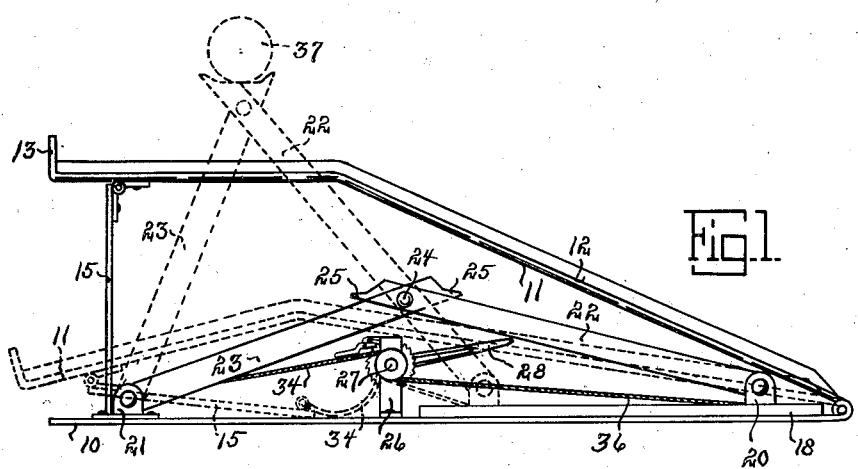
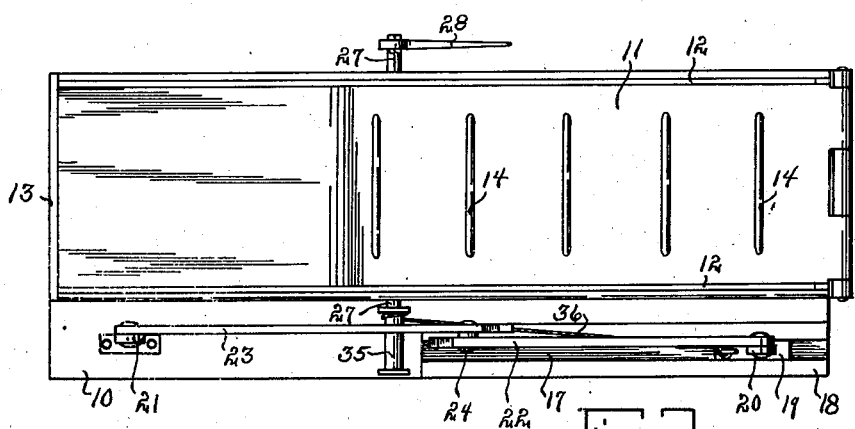
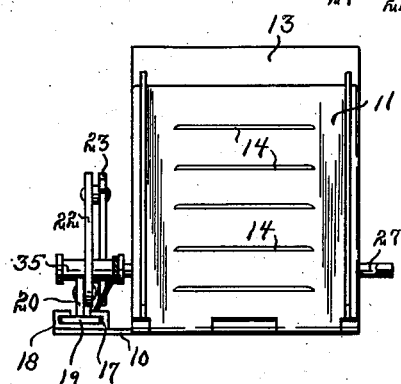
INVENTORS
H.H. POLK & W.J. MARKS
BY
M. Talbert Dick
ATTORNEY.

July 18, 1939.  H. H. POLK ET AL  2,166,477
COMBINATION WHEEL RAMP AND WHEEL JACK
Filed March 6, 1939  2 Sheets-Sheet 2
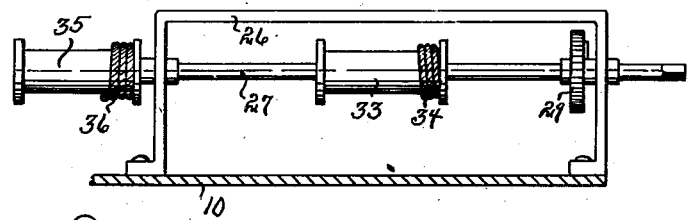
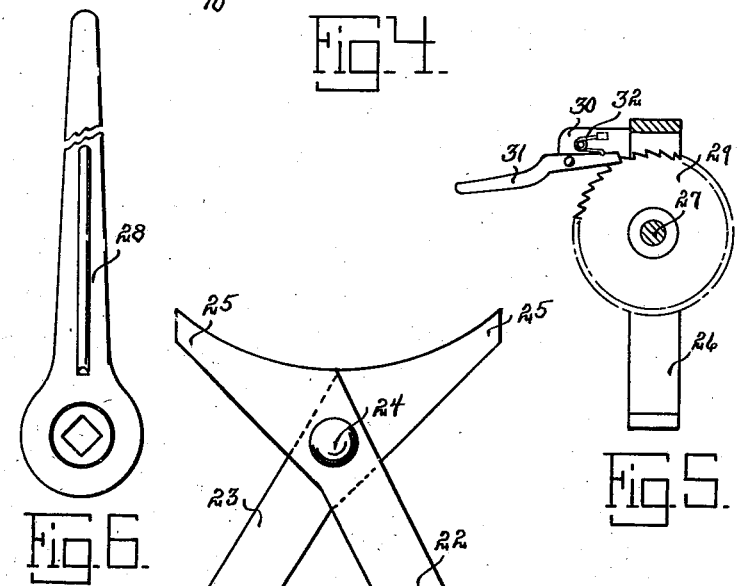
INVENTORS
H.H. POLK & W.J. MARKS
BY
M. Talbert Dick
ATTORNEY.

Patented July 18, 1939

2,166,477

UNITED STATES PATENT OFFICE 2,166,477

COMBINATION WHEEL RAMP AND WHEEL JACK

Harry H. Polk and William J. Marks, Des Moines, Iowa

Application March 6, 1939, Serial No. 259,960

6 Claims. (Cl. 254—88)

The principal object of our invention is to provide an apparatus in one unit that may be used for quickly and easily accomplishing the elevation of a wheel of an automotive vehicle such as an automobile, truck, bus or like, and which will successfully hold the wheel in such raised position after its elevation from a normal position has been accomplished.

More specifically, the object of this invention is to provide in combination a collapsible ramp for use in getting the wheel into a raised condition and a supporting jack means for holding the wheel in such an elevated position after the ramp has been collapsed.

A still further object of this invention is to provide a combination wheel ramp and supporting jack that is so connected together and operated that the movement of the supporting jack into proper position for engaging the axle or other associated part of the wheel of the vehicle will also cause the collapsible ramp to collapse, thereby leaving the wheel suspended and indirectly supported on the jack support.

A still further object of this invention is to provide a combination wheel ramp and supporting jack that is economical in manufacture, durable in use, easily and quickly operated, and when in a folded condition occupies a minimum amount of space.

These and other objects will be apparent to those skilled in the art.

Our invention consists in the construction, arrangement and combination of the various parts of the device, whereby the objects contemplated are attained as hereinafter more fully set forth, pointed out in our claims and illustrated in the accompanying drawings.

Fig. 1 is a side view of our complete device ready for use and showing the position of the various parts in dotted lines when the jack supporting portion is serving the function of supporting axle, axle housing or like and the ramp portions have been collapsed.

Fig. 2 is a top plan view of our combination ramp and supporting jack.

Fig. 3 is a front end view of our apparatus with the ramp portion elevated and in position for a wheel to be run upon it.

Fig. 4 is a cross sectional view of a portion of our device showing the control shaft assembly.

Fig. 5 is an enlarged inner side view of the ratchet mechanism used in the device.

Fig. 6 is an enlarged view of an ordinary ratchet wrench used to manually rotate the operating and control shaft.

Fig. 7 is an enlarged side view of the upper portion of the jack support part of the device.

Fig. 8 is a side sectional view of a portion of the jack plate and ramp supporting trigger.

The usual method of raising the wheel of an automotive vehicle to an elevated position for the changing or repairing of a tire or like is by the use of a manually operated jack. Such lifts are either operated by a cranking lever or by a pumping lever. In either event, it is a considerable task to pump or crank up a wheel and then crank or pump the wheel back to a lower position. This is especially true with modern, low-hung automotive vehicles. We have overcome such objections by providing an apparatus that requires no manual pumping or cranking to elevate or lower the vehicle wheel.

Referring to the drawings, we have used the numeral 10 to designate the base portion of our device. This base portion may be made of any suitable material such as sheet metal and is designed to rest on the ground or another supporting surface below the vehicle of the wheel to be raised. Due to the substantial flat area of this base 10, our device does not have a tendency to sink down into the ground nor to tip over during its use. The numeral 11 designates the ramp portion of the apparatus. This ramp is hingedly secured at one end to one end of the base 10 as shown in Fig. 2. The numeral 12 designates vertically extending side walls on the two marginal side edges of the ramp. The numeral 13 designates a vertically extending stop wall on the upper end of the ramp 11. This ramp 11 extends when in an elevated position from the base 10 transversely upwardly and over the base 10 at an angle thereto and then horizontally as shown in Fig. 1. The numeral 14 designates ridges formed in the ramp 11 for strengthening the ramp and also giving traction to the wheel running upwardly upon it. The numeral 15 designates the ramp supporting trigger hingedly secured near the under free end of the ramp. This supporting trigger 15 when in a vertical position extends between the ramp and the base 10, thereby supporting the free end of the ramp 11 in an elevated position above the base 10 as shown in Fig. 1. The numeral 16 designates a bead or stop on the base 10 and to the outer side of the lower end of the trigger support for limiting the accidental movement of the trigger outwardly from under the ramp in one direction as shown in Fig. 8. Obviously, the movement of the trigger support 15 inwardly and under the ramp 11 would remove the support given to the outer end of the ramp and the ramp would collapse as shown by dotted lines in Fig. 1. The width of the ramp 11 is substantially less than the width of the base 10 as shown in Fig. 2. The numeral 17 designates an elongated dove-tailed groove in the bar member 18. This bar member is rigidly and permanently secured on the base 10 and at the side of the vertical plane of the ramp 11. The numeral 19 designates a block member slidably mounted in the dove-tailed groove 17. This bar member 18 is parallel with the ramp 11 and extends from the end of the base 10 to which the ramp is hinged. The numeral 20 designates an upwardly extending post on the member 19. The numeral 21 designates a stub post secured by suitable means on the upper surface of the base 10 and in a plane at one side of the ramp 11 as shown in Fig. 2. The numeral 22 designates a jack arm having its lower end hingedly secured to the post 20. The numeral 23 designates the second jack arm having one of its ends hingedly secured to the post 21. These two jack arms 22 and 23 cross each other and are pivoted together near their upper ends by a rivet or like 24 as shown in Fig. 7. The numeral 25 designates outwardly and upwardly extending prong portions on the two upper ends of the jack arms respectively. These projections 25 extend in opposite directions and are designed to engage and support the axle housing or associated parts of a vehicle adjacent the wheel to be maintained in a raised condition. By this construction, when the block member 19 is slid to the outer end of the bar 18, the two supporting arms that make up the supporting jack will be in a lowered condition as shown in Fig. 1 and when the block 19 is slid inwardly and toward the central area of the base 10, the supporting jack arms will be moved to elevated positions as shown by dotted lines in Fig. 1. The numeral 26 designates a shaft bearing permanently secured on the upper central area portion of the base 10. This shaft bearing is in the form of an inverted U-member as shown in Fig. 4. The numeral 27 designates a shaft rotatably mounted in the bearing member 26 and extending across and transversely of the longitudinal axis of the base 10. One end of this shaft 27 extends beyond the side edge of the base 10 and is squared as shown in Fig. 4 to receive the socket portion of an ordinary ratchet wrench 28. The numeral 29 designates a ratchet wheel rigidly secured on the shaft 27 and in proximity to the squared end of the shaft 27. The numeral 30 designates an ear member extending from the bearing bracket member 26. The numeral 31 designates a handled dog hingedly secured between its two ends to the ear support 30 and capable of having one of its ends engage the teeth of the sprocket gear 29 for preventing the rotation of the shaft 27 in one direction at times. The numeral 32 designates a spring element having one end secured to the ear 30 and its other end in engagement with the dog 31 for yieldingly holding the dog in engagement with the teeth of a sprocket gear 29 as shown in Fig. 5. The numeral 33 designates a drum rigidly secured on the shaft 27. The numeral 34 designates a cable, chain or like flexible elongated member having one end secured to the drum 33 and its other end secured to the inside lower end portion of the trigger support 15. The numeral 35 designates a second drum rigidly secured on the shaft 27. The numeral 36 designates a cable, chain or like flexible elongated member having one end secured to the drum 35 and its other end secured to the block member 19. By this arrangement of parts, when the shaft 27 is rotated in the proper direction by the wrench 28, the cables 34 and 36 will wind up on the drums 33 and 35 respectively thereby pulling the trigger support 15 inwardly from a supporting position and toward the shaft 27 and the block 19 toward the shaft 27, thereby raising the jack support and collapsing the ramp. To use our device, it is merely necessary to place our device in front or back of the wheel to be raised with the square end portion of the shaft extending outwardly from the vehicle. The jack support portion is lowered by moving the block 19 outwardly and unwinding a portion of the cable 27 to accommodate this action. The trigger support 15 is placed in a vertical position thereby unwinding a suitable amount of cable 34. To permit the unwinding of the cables 34 and 36, the dog 31 will have to be manually depressed to permit the free rotation of the shaft 27. With the parts of the apparatus in position as shown in Fig. 1, the car is then driven forwardly or backwardly as the case may be, until the wheel desired to be raised is onto the horizontal portion of the elevated ramp 11. The brakes of the car are then set and by the use of the wrench 28 or similar crank means, the shaft 27 is rotated upwardly under and adjacent to the axle, axle housing or other associated part, of the wheel of the vehicle. As herebefore seen, as the jack support approaches its extreme upright position, the trigger support 15 will also be moved from under the ramp. The cables 34 and 36 are so adjusted, however, that the trigger 15 will not be rendered ineffective for supporting the ramp until the jack support is in substantially an elevated position. The cables 34 and 36 may be adjusted for different cars and different conditions. With the jack support directly under the part of the vehicle to be supported, the further rotation of the shaft 27 will pull the trigger 15 from under the free end of the ramp, thereby causing the ramp to collapse. The vehicle wheel, however, will still be suspended in the air due to the fact that the jack support will assume the duty of holding the wheel up. In Fig. 1, we show by dotted lines the axle or like 37 being held and supported on the jack support. With the wheel suspended, it may be removed, repaired or like. When it is desired to remove the device from under the vehicle, it is merely necessary to remove the wrench 28 and kick or force the pawl 31 out of engagement with the teeth of the ratchet wheel 29. This permits the free rotation of the shaft 27 and permits the block 19 to slide outwardly for collapsing the jack support. With the jack support in collapsed condition, the wheel will be lowered on the collapsed ramp, after which it is merely necessary to drive the vehicle off of the device. If it is desired to let the jack support down gradually, the same may be accomplished by actuating the wrench 28 and pawl 31 in the usual manner.

From the foregoing, it will readily be seen that we have provided a highly desirable apparatus. Little effort is required to place it in operative position as the wheel of the vehicle is moved to an elevated position by the vehicle itself and the cranking up of the jack support requires practically no effort as there is no weight on this jack support until after the trigger 15 has been tripped.

Some changes may be made in the construction and arrangement of our improved combination wheel ramp and wheel jack without departing from the real spirit and purpose of our invention, and it is our intention to cover by our claims any modified forms of structure or use of mechanical equivalents which may be reasonably included within their scope.

We claim:

1. In a device of the class described, a base member, a collapsible ramp on said base member, an elevatable jack support mechanism on said base member, and connected actuatable elements operatively connected to said jack support mechanism and said collapsible ramp for lowering or raising said jack support mechanism, and the collapsing of said ramp.

2. In a device of the class described, a base member, a ramp element hingedly secured at one end to said base member, a trigger support for supporting the free end of said ramp at times, an elevatable jack support mechanism on said base member, and a manually operated means operatively connected to said trigger and to said jack support mechanism.

3. In a device of the class described, a base member, a ramp element hingedly secured at one end to said base member, a supporting trigger member hingedly secured to the free end of said ramp element for supporting said ramp element at times, an elevatable support on said base member, and a shaft rotatably mounted on said base member operatively connected to said supporting trigger member and said elevatable support.

4. In a device of the class described, a base member, a ramp element hingedly secured at one end to said base member, a supporting trigger member hingedly secured to the free end of said ramp element for supporting said ramp element at times, an elevatable support on said base member, a shaft rotatably mounted on said base member operatively connected to said supporting trigger member and said elevatable support, and a means for limiting the rotation of said shaft in one direction at times.

5. In a device of the class described, a base member, a ramp element hingedly secured at one end to said base member, a supporting trigger member hingedly secured to the free end of said ramp element for supporting said ramp element at times, an elevatable support on said base member, a shaft rotatably mounted on said base member, an elongated flexible member having one end secured to said trigger support and its other end operatively secured to said shaft, and a second elongated flexible member having one end secured to said elevatable support and its other end operatively secured to said shaft.

6. In a device of the class described, a base member, a ramp element hingedly secured at one end to said base member, a supporting trigger member hingedly secured to the free end of said ramp element for supporting said ramp element at times, an elevatable support on said base member, a shaft rotatably mounted on said base member, an elongated flexible member having one end secured to said trigger support and its other end operatively secured to said shaft, a second elongated flexible member having one end secured to said elevatable support and its other end operatively secured to said shaft, a means for holding said shaft in different positions of its rotation, and a handle means to facilitate the rotation of said shaft.

HARRY H. POLK.
WILLIAM J. MARKS.